United States Patent
Lee

(10) Patent No.: US 7,310,250 B2
(45) Date of Patent: Dec. 18, 2007

(54) OUTPUT VOLTAGE CIRCUIT OF POWER SUPPLY

(75) Inventor: Chin-Szu Lee, Taipei Hsien (TW)

(73) Assignee: Topower Computer Industrial Co., Ltd, Taipei Hsien (TW)

( * ) Notice: Subject to any disclaimer, the term of this patent is extended or adjusted under 35 U.S.C. 154(b) by 113 days.

(21) Appl. No.: 11/209,806

(22) Filed: Aug. 24, 2005

(65) Prior Publication Data

US 2007/0052369 A1 Mar. 8, 2007

(51) Int. Cl.
*H02H 7/125* (2006.01)
(52) U.S. Cl. .................................... 363/52
(58) Field of Classification Search .............. 363/13, 363/15, 17–18, 51–52, 58, 61, 108, 171
See application file for complete search history.

(56) References Cited

U.S. PATENT DOCUMENTS

| | | | |
|---|---|---|---|
| 6,522,560 B1 * | 2/2003 | Lin et al. ................. | 363/89 |
| 6,580,624 B2 * | 6/2003 | Arai ........................ | 363/95 |
| 7,054,175 B2 * | 5/2006 | Kurio et al. ............... | 363/65 |
| 7,095,636 B2 * | 8/2006 | Sarlioglu ................... | 363/39 |
| 7,110,266 B1 * | 9/2006 | Porter et al. ............. | 363/21.01 |
| 7,116,560 B2 * | 10/2006 | Chou et al. ................ | 363/16 |
| 2005/0030774 A1 * | 2/2005 | Vazquez Carazo .......... | 363/84 |

* cited by examiner

*Primary Examiner*—Shih-Chao Chen
*Assistant Examiner*—Minh Dieu A
(74) *Attorney, Agent, or Firm*—Birch, Stewart, Kolasch & Birch, LLP

(57) ABSTRACT

An output voltage circuit for power supply aims to arrange output DC power according to component voltage and equalizing current. The power supply has a voltage transformation circuit which consists of transformers each has at least one high voltage power and one low voltage power. The high voltage power output from each transformer is coupled in parallel and integrated on the same line to be output to a load at the rear end. Each low voltage power is output through a single line to another load at the rear end. Thus the load of the transformers is reduced and a desired electricity condition can be maintained.

3 Claims, 4 Drawing Sheets

OUTPUT VOLTAGE CIRCUIT OF POWER SUPPLY

FIELD OF THE INVENTION

The present invention relates to an output voltage circuit of power supply and particularly to a power supply to output DC power through a plurality of transformers for transforming voltage and providing component voltage and equalizing current.

BACKGROUND OF THE INVENTION

Power supply is the basic equipment to provide operation 10 power to computer systems. As applications of the Internet and multimedia technology become more advanced, demand for reliable power supply also grows. Hence how to prevent the power supply from being damaged in the condition of heavy workload or overload in a long period of time, and avoid the computer system from operation interruption or damage due to abnormal condition of the power supply have become a main research and development focus in the industry.

Refer to FIG. 1 for a circuit block diagram of a conventional power supply that outputs DC power. The power supply is connected to an external power source, and includes a primary rectification and filter circuit, a transformer and a secondary rectification and filter circuit to transform and output a plurality of DC powers to the loads at the rear end. The output DC power has electricity level specifications of 12V, 5V, 3.3V and the like. As the power consumed by the electronic devices of users increases constantly, the conventional technique that adopts a single transformer has to boost power by increasing the coil number and total size. But the dimension and interior of the power supply cannot be changed under the present specification. Hence fabrication of a single transformer is quite difficult. Not only the size cannot meet requirements, voltage transformation generates high temperature which cannot be cooled effectively. As a result, operation of electronic elements is affected. Moreover, the DC power output from a single transformer includes multiple sets of electricity level, a greater power loss incurs.

To remedy the aforesaid disadvantages, there is an approach that adopts multiple transformers to provide DC power output through component voltage. FIGS. 2 and 3 are examples of such a technique. In FIG. 2, one transformer outputs only DC power of 12V, and another transformer outputs DC power of 12V, 5V and 3.3V. Thus the main DC power of 12V adopts the design of dividing current. But for the transformer that outputs multiple sets of DC power, the current passing through is not reduced, and the temperature of the transformer increases significantly. In FIG. 3, the high voltage power and the low voltage powers are controlled respectively by separated transformers. As the DC power of 12V is the main power supply, the temperature of the two transformers differs. Moreover, the total size cannot be reduced. Installation of the power supply is difficult when power requirement increases.

SUMMARY OF THE INVENTION

Therefore the primary object of the present invention is to solve the aforesaid disadvantages. The invention provides a power supply technique that includes a plurality of transformers that supply component voltage and equalized current. Each transformer in the voltage transformation circuit of the power supply outputs DC power which includes at least one high voltage power and one low voltage power. Moreover, the high voltage power output by each transformer is coupled and integrated on the same line to be output to a load at the rear end. The low voltage power is output through a single line to another load at the rear end. Hence the coil size of each transformer is nearly equalizing. The current passing through each transformer also is nearly the same. Therefore the temperature rising condition and loading condition of each transformer are proximate to each other. And the power supply can be maintained a desirable electricity condition.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
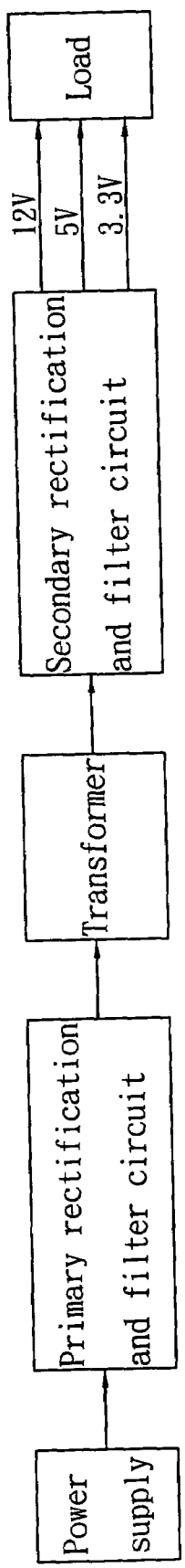
FIGS. 1, 2 and 3 are circuit block diagrams of embodiments of the conventional power supply.
Figure 2:
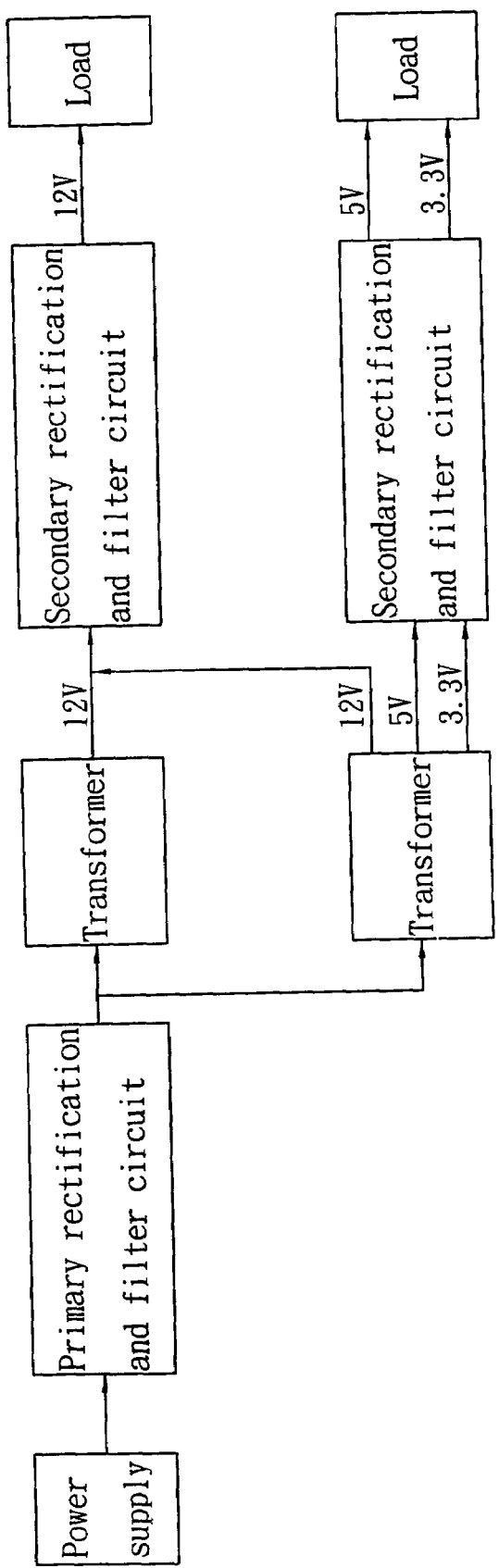
Figure 3:
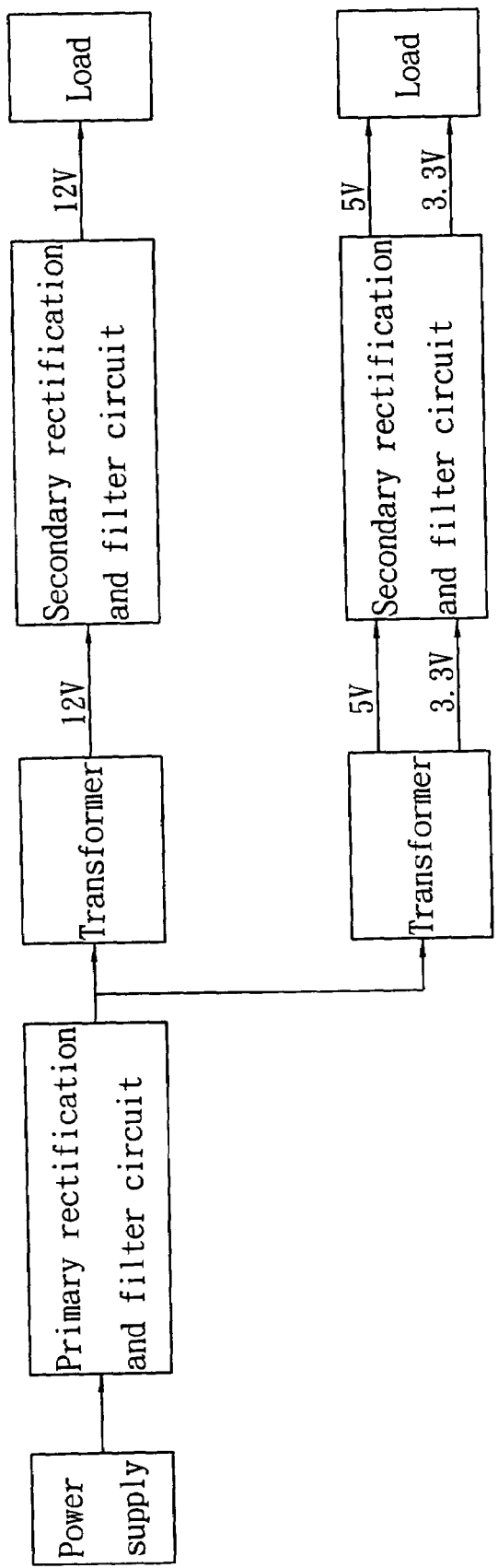
Figure 4:
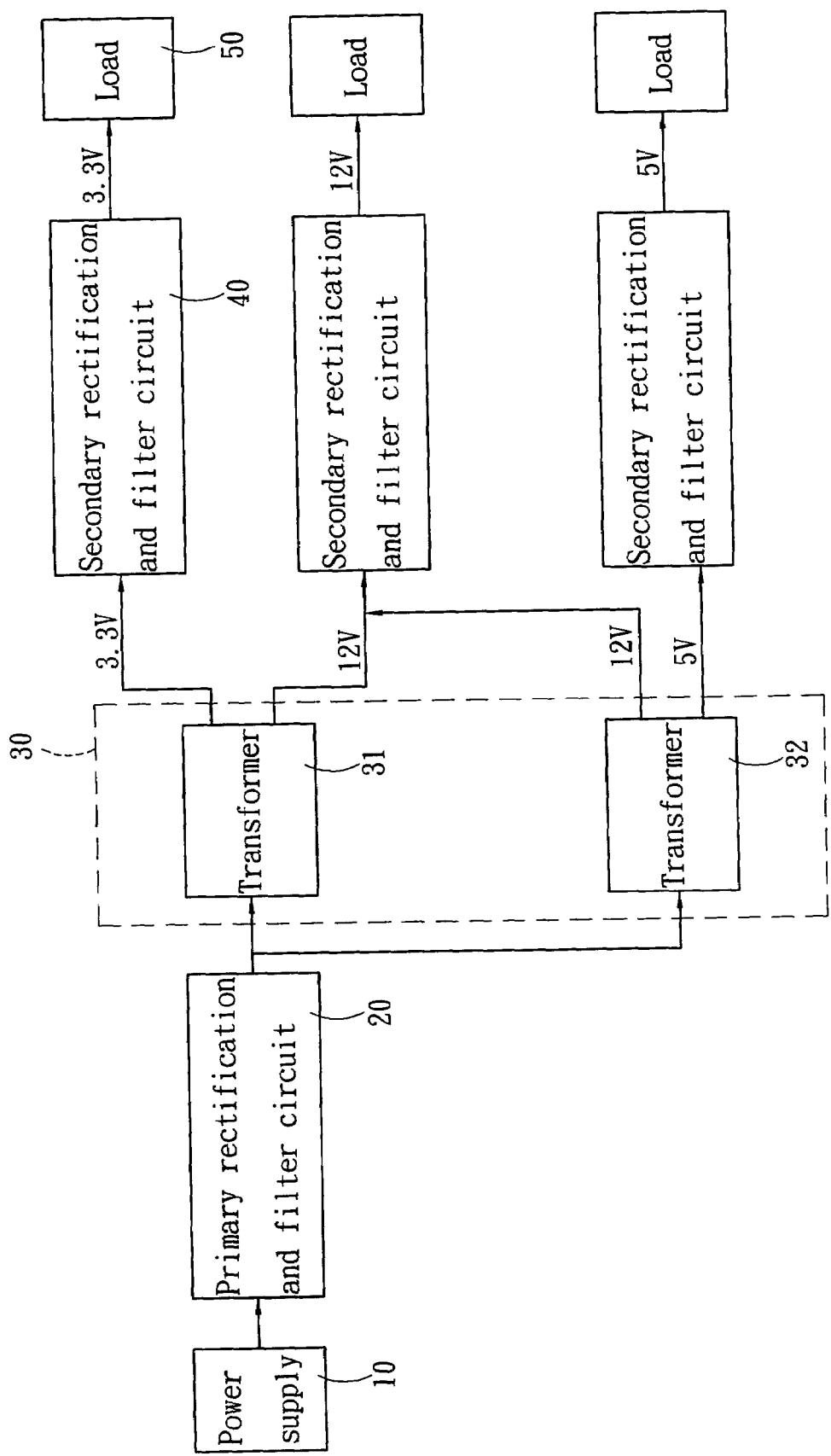
FIG. 4 is a circuit block diagram of an embodiment of the present invention.

Please refer to FIG. 4 for the circuit block diagram of an embodiment of the invention. The power supply output voltage circuit of the invention is connected to an external power supply 10. It includes a primary rectification and filter circuit 20, a voltage transformation circuit 30 consisting of a plurality of transformers 31 and 32, and a secondary rectification and filter circuit 40 to transform and output a plurality of DC power to loads 50 at the rear end. The DC power includes a high voltage power and a plurality of low voltage powers based on the electricity level. The DC power transformed and output by the transformers 31 and 32 includes at least one high voltage power and one low voltage power. Moreover, the high voltage power output by the transformers 31 and 32 are coupled in parallel and integrated on one line to be output to a load 50 at the rear end. Each low voltage power is output through an individual line to another load 50 at the rear end. The DC power for the electricity required on the electronic equipment of the loads 50 at the rear end includes 12V, 5V and 3.3V. In this embodiment, the high voltage power is 12V, while the low voltage powers are 5V and 3.3V. As shown in the drawing, the high voltage power is integrated and electrically connected to one secondary rectification and filter circuit 40. The low voltage powers are respectively connected to the secondary rectification and filter circuit 40. Based on the present technology, all power can be integrated to the same secondary rectification and filter circuit 40. Similarly, the primary rectification and filter circuit 20 and other mating circuits (such as power factor corrector, PWM controller, power switch, and the like) may also be configured in a single set or multiple sets. The configured number does not affect the technical characteristics of the invention. To facilitate understanding, the embodiment indicates the electricity level of the final DC power without showing the electricity level square wave before rectification and filtering.

As shown in FIG. 4, the invention distributes the high voltage power to two transformers 31 and 32. The low voltage power is distributed individually to different transformers 31 and 32. Hence the size of the transformers 31 and 32 can be equalized to facilitate fabrication of the power supply of a greater power. Moreover, when the loads 50 at the rear end are under heavy loading conditions, the current is evenly shared by the two transformers 31 and 32, thus the temperature of the transformers 31 and 32 does not increase very much due to concentration of current. Hence the two transformers 31 and 32 can provide desired electric conditions and have a longer life span.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An output voltage circuit for a power supply, the power supply comprising a primary rectification and filter circuit, a voltage transformation circuit which includes a plurality of transformers and a secondary rectification and filter circuit to transform and output a plurality of DC powers to loads at a rear end that include a high voltage power and a plurality of low voltage powers based on the electricity level of the DC power, the DC power output by each of the plurality of transformers includes at least one high voltage power and one low voltage power, the high voltage power output by each transformer being coupled in parallel and integrated on a same line to be output to a load at a rear end, each low voltage power being output through a single line to another load at the rear end.

2. The output voltage circuit for a power supply of claim 1, wherein the DC power includes 12V, 5V and 3.3V, the high voltage power being 12V, and the low voltage powers being 5V and 3.3V.

3. The output voltage circuit for a power supply of claim 1, wherein the high voltage power is integrated and electrically connected to one secondary rectification and filter circuit.

\* \* \* \* \*